US010843261B2

(12) United States Patent
Balachandran et al.

(10) Patent No.: US 10,843,261 B2
(45) Date of Patent: Nov. 24, 2020

(54) METHOD FOR MAKING METAL-NANOSTRUCTURED CARBON COMPOSITES

(71) Applicant: UCHICAGO ARGONNE, LLC, Chicago, IL (US)

(72) Inventors: Uthamalingam Balachandran, Willowbrook, IL (US); Beihai Ma, Naperville, IL (US); Tae H. Lee, Naperville, IL (US); Stephen E. Dorris, LaGrange Park, IL (US); David R. Forrest, Washington, DC (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 292 days.

(21) Appl. No.: 16/009,897

(22) Filed: Jun. 15, 2018

(65) Prior Publication Data
US 2019/0381563 A1 Dec. 19, 2019

(51) Int. Cl.
| | | |
|---|---|---|
| *B22F 1/00* | (2006.01) | |
| *B22F 3/11* | (2006.01) | |
| *C01B 32/21* | (2017.01) | |
| *B01J 19/08* | (2006.01) | |
| *B82Y 40/00* | (2011.01) | |

(52) U.S. Cl.
CPC .......... *B22F 1/0018* (2013.01); *B22F 3/1134* (2013.01); *C01B 32/21* (2017.08); *B01J 19/087* (2013.01); *B22F 2302/40* (2013.01); *B82Y 40/00* (2013.01)

(58) Field of Classification Search
CPC ... B01J 19/087; B22F 1/0018; B22F 2302/40; B22F 3/1134; B82Y 40/00; C01B 32/21; C22C 1/1036; C22C 2001/1047; C22C 32/0084
See application file for complete search history.

(56) References Cited

U.S. PATENT DOCUMENTS

| | | |
|---|---|---|
| 8,541,336 B2 | 9/2013 | Shugart et al. |
| 8,647,534 B2 | 2/2014 | Shugart et al. |
| 9,273,380 B2 | 3/2016 | Shugart et al. |
| 2016/0101398 A1 | 4/2016 | Worsley et al. |
| 2017/0298476 A1 | 10/2017 | Braydich et al. |
| 2018/0073110 A1 | 3/2018 | Balachandran et al. |

OTHER PUBLICATIONS

Bakir, M. et al., Novel Metal-Carbon Nanomaterials: A Review on Covetics, Advanced Materials Letters 8 (9), 884-890 (2017).
(Continued)

*Primary Examiner* — Jenny R Wu
(74) *Attorney, Agent, or Firm* — Olson & Cepuritis, Ltd.

(57) ABSTRACT

A method for making covetic metal-nanostructured carbon composites or compositions is described herein. This method is advantageous, in that it provides substantially oxygen-free covetic materials and allows precise control of the composition of the covetic material to be produced. The method comprises introducing carbon into a molten metal in a heated reactor under low oxygen partial pressure, while passing an electric current through the molten metal. The reactor is heated at a temperature sufficient to form a network of nanostructured carbon within a matrix of the metal. After heating the covetic material is recovered from the reactor.

12 Claims, 5 Drawing Sheets

(56) References Cited

OTHER PUBLICATIONS

Forrest, David R., Approaches to High Performance Conductors, Next Generation Electric Machines Workshop, NIST, Gaithersburg, MD (2015).
Forrest, D.R. et al., Novel Metal-Matrix Composites with Integrally-Bound Nanoscale Carbon, Proceedings of Nanotech Conference and Expo, Santa Clara, CA, CRC Press (2012).
Knych, T. et al., Fabrication and Cold Drawing of Copper Covetic Nanostructured Carbon Composites, Archives of Metallurgy and Materials 59 (4), 1283-1286 (2014).
Salamanca-Riba, L. et al., A New Type of Carbon Nanostructure Formed Within a Metal-Matrix, Presented at Tech Connect World, Santa Clara, CA (2012).

METHOD FOR MAKING METAL-NANOSTRUCTURED CARBON COMPOSITES

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE INVENTION

This invention relates to a method for making metal-nanostructured carbon composites, also known as covetic materials, more specifically, to a method for making covetic metal-nanostructured carbon composite materials, and to materials prepared by the method.

BACKGROUND

Significant research interest has been attracted to the development of metal-carbon composites and compounds, known as "covetic" materials, in an effort to improve their thermophysical, mechanical, and electrochemical properties. Such materials have a form of nanocarbon dispersed within a metal matrix. The term "covetic" is derived from "covalent" and "metallic", in that there appears to be some type of hybrid bonding with attributes of covalent bonds and of metallic bonds between the metal and the carbon nanoparticles. Added carbon incorporates into the metal matrix and has an effect on several of the properties of the material, such as raising the melting point and significantly altering surface tension, thus porosity during solidification. Covetic materials can retain their enhanced properties after re-melting, and have demonstrated the ability to withstand more than 1,500 degrees Celsius without separation of carbon and metals. The covetic material can be turned into a vapor phase at even higher temperatures, be deposited on another surface, and still retain the nanocarbon phase and enhanced properties. The effects of added carbon depend on the metal used.

Processing methods have been developed for making covetic compositions. For example, metal-carbon compositions have been prepared via mixing carbon powder into melted metal (e.g., Cu, Al, Ag, Au, Fe, Ni, Pt, Sn, Pb,) by stirring and applying an electrical current of hundreds of amperes (See U.S. Pat. No. 8,647,534) between submerged electrodes, and then solidifying the mixture Such metal-carbon compositions reportedly are and remain single phase upon remelting and solidification. Similar to conventional metals, these metal-carbon composites can be rolled into thin sheets, drawn into wires, or machined into parts.

Conventional processes for making covetic metal-carbon compositions, such as covetic copper-carbon composites (also referred to herein as "covetic copper") or covetic aluminum-carbon composites ("covetic aluminum") have typically been performed in an ambient air atmosphere. In many conventional process for preparing covetic metal materials, the metal is melted, carbon powder is stirred into the molten metal, and an electrical current (>100 Amp) is passed through the molten material. One of the downsides of the conventional method is the undesirable formation of metal oxides. With approximately 0.21 atm oxygen in ambient air, the formation of metal oxides is not surprising, even with the large amount of carbon powder that is added to the molten metal.

In one known method, described in U.S. Patent Publication No. 2017/0298476 (Braydich et al.), a covetic material reportedly is prepared by heating a mixture of molten metal (e.g., Cu or Al) and carbon to a first threshold temperature to reportedly form metal-carbon bonds (e.g., about 100° F. above the melting point of the metal), and subsequently heating the mixture to a second threshold temperature greater than the first threshold temperature. The second threshold temperature is at or above a temperature at which ordered multi-phase covetics reportedly form (e.g., about 500° F. above the first threshold temperature). The method of Braydich et al. preferably is performed with vigorous mixing (i.e., vortex mixing) and with application of an electric current to the mixture (e.g., about 200 to 700 amperes). The method described by Braydich et al. also appears to utilize an ambient, oxygen-containing atmosphere over the heated mixture, as there is no mention of excluding oxygen.

Another known process, described in U.S. Patent Publication No. 2018/0073110 (Balachandran et al.), utilizes an electron beam under vacuum for heating of a carbon-metal mixture to form the covetic material, by generating an electric current in the melt. While this method can form covetics effectively, the use of an electron beam may be difficult to implement for some potential manufacturers, especially at large scales.

There is an ongoing need for alternative methods for producing covetic materials with improved properties over native metal. The processes and materials described herein address this need.

SUMMARY

As described herein, a method for preparing a covetic metal-carbon composite material comprises introducing carbon (e.g., graphite) into a molten metal (e.g., Cu, Al, and the like) in a heated reactor under an atmosphere comprising a partial pressure of oxygen of not more than about 0.1 Torr, while passing an electric current through the molten metal by a pair of electrodes contacting the molten metal and in circuit with an electrical power source at a current density of about 10 to about 100 Amperes per square centimeter (A/cm$^2$) based on the area of the electrodes contacting the molten metal. The molten metal fills the reactor to a level such that the upper, exposed surface of the metal is located about one third to one half of the distance from the top of the interior of the reactor. The carbon is introduced at or below the top surface of the molten metal, and is mixed with the metal by stirring, preferably using gentle (non-vortexing) stirring, to distribute carbon within the molten metal. The reactor is heated at a temperature sufficient to keep the metal molten during the entire conversion process. After the reaction is complete the covetic material is recovered from the reactor. As used herein and in the appended claims, the phrase "at or below the surface" means that the carbon is introduced either below the surface of the molten metal or within about an inch (preferably within about one half inch) above the surface of the molten metal, e.g., to minimize exposure of the carbon to residual oxygen. As used herein and in the appended claims, the phrase "under an atmosphere comprising a partial pressure of oxygen of not more than about 0.1 Torr" refers to use of a vacuum or an inert gas to maintain the oxygen level at or below the specified level.

In another embodiment, specifically useful for aluminum, silver gold, lead, zinc, silicon, tin, and nickel covetics, the process can be run in ambient air in a graphite reactor with graphite electrodes. A small amount of graphite from the electrodes, the reactor, or the carbon source is converted to carbon monoxide which blankets the surface of the molten metal. The reducing atmosphere created by the carbon monoxide maintains the oxygen level in the molten metal at a sufficient level to prevent metal oxide contamination in the covetic product.

In yet another embodiment, a preformed mixture of carbon and a metal (e.g., a metal powder) is heated at a temperature greater than the melting point of the metal under an inert atmosphere that maintains the oxygen level sufficiently low to avoid oxygen contamination of the nanocarbon phase of the covetic product. As used herein and in the appended claims, the phrase "under an inert atmosphere" refers to use of a vacuum or an inert gas to maintain the oxygen level at or below the specified level.

In any of the processes described herein, the electrodes and any stirring equipment or other accessories may be removed from the molten covetic product prior to isolating the product. The covetic material optionally can be cooled at a controlled rate (e.g., about 100 to 150° C. per hour) before or after being removed from the reactor.

The fabrication methods described herein are advantageous in that they provide substantially oxide-free covetic materials (or at least covetic materials with oxide levels low enough not to significantly interfere with the properties of the covetic material) via processes that allow precise control of the composition of the covetic material to be produced. The processes also are amenable to large scale production. The covetic reaction between metal and carbon takes place under the influence of electrical current and heating, under a low oxygen atmosphere, which reduces oxygen contamination and losses of carbon due to oxidation. The conversion of carbon to a structured nanophase produces enhanced properties such as better electrical and thermal conductivities, relative to the pure metal (without any carbon added). Covetic copper and covetic aluminum produced by one or more of the processes described herein exhibited surprisingly enhanced electrical and thermal conductivities relative to pure copper and pure aluminum, respectively.

In some embodiments, the metal is selected from the group consisting of copper, aluminum, silver, gold, platinum, iron, and nickel. In some preferred embodiments, the metal comprises copper or aluminum. In any of the process embodiments described herein the metal can be introduced into the reactor in any convenient form, e.g., as chunks, slugs, grains, shot, powders, and the like.

The carbon can be any type of elemental carbon. In some embodiments, the carbon comprises graphite, carbon black, graphene, carbon nanotubes, carbon nanofibers, or a combination of two or more thereof. In some preferred embodiments, the carbon is graphite. In some preferred embodiments the carbon is a particulate carbon material. Preferably, the particulate carbon material comprises carbon granules, carbon microparticle powder, or a combination of such materials. Optionally, the carbon particles can comprise carbon nanotubes, carbon nanofibers, or a combination thereof, which can be pre-encapsulated by a metal, unencapsulated, or which can encapsulate metal atoms. Preferably, the amount of carbon added to the metal comprises about 0.1 to about 10 percent by weight based on the total combined weight of the metal and carbon. In some preferred embodiments, the metal comprises copper or aluminum, and the carbon material comprises graphite.

The reactor vessel used in process described herein may be open (i.e., not sealed) or closed (i.e., sealed) with inlets and outlets for gas control, stirring, adding carbon, adding the metal, and the like. The reactor vessel and all other components that will be exposed to the temperatures required for the process are composed of materials capable of handling the temperatures achieved during the process. In some embodiments the reactor vessel and other internal components are composed of graphite, a ceramic (e.g., aluminum oxide ceramic), and similar materials. In some embodiments, the reactor comprises a stirrer (e.g., made from graphite or a ceramic material) for mixing of the carbon with the molten metal (in some cases, gentle, non-vortexing mixing is preferred). The reactor also includes electrodes (e.g., graphite or inert electrodes) for passing the electric current through the molten metal. The electrodes can be planar in form to provide a good surface area for current application, if desired.

In order to maintain the required low partial pressure of oxygen, the reactor, if unsealed, may, itself, be contained in a sealed chamber under a vacuum, or may be kept under an inert gas, to maintain the partial pressure of oxygen at or below a level suitable for a given metal. Any inert gas with the required low partial pressure of oxygen may be utilized in the process described herein. In some embodiments the inert gas comprises nitrogen (e.g., high purity or ultra-high purity nitrogen). In other embodiments the inert gas comprises helium (e.g., high purity or ultra-high purity (UHP) helium). Optionally, a vacuum may be used to maintain the partial pressure of oxygen to a suitably low level. In the present method, the partial pressure of oxygen within the reaction vessel preferably is in the range of about 0.001 Torr to about 0.1 Torr, although even lower partial pressures are entirely acceptable.

Also described herein is a covetic metal-carbon composite produced by the process described herein. Preferably, the base metal component of the covetic material is selected from the group consisting of copper, aluminum, silver, gold, platinum, iron, lead, silicon, zinc, tin, and nickel, optionally along with alloying elements to balance the full range of thermophysical and mechanical properties that may be desired. Preferably, the carbon is present at a concentration of about 0.1 to about 10 percent by weight based on the total weight of the composite. In some embodiments, the carbon is present at a concentration of about 0.3 to about 2 percent by weight based on the total weight of the composite.

The following non-limiting, exemplary embodiments illustrate certain aspects and features of the processes and materials described herein.

Embodiment 1 is a process for preparing a covetic metal-carbon composite material comprising the steps of:

(a) introducing carbon into a molten metal in a heated reactor under an atmosphere comprising a partial pressure of oxygen of no more than about 0.1 Torr, while passing an electric current through the molten metal at a current density of about 10 to about 100 amperes per square centimeter by a pair of electrodes contacting the molten metal and in circuit with an electrical power source; wherein the molten metal fills the reactor to a level such that an exposed surface of the metal is located about one third to one half of the distance from an internal height in the reactor; the carbon is introduced at or below the exposed surface of the molten metal with mixing to distribute carbon within the molten metal; and the reactor is heated at a temperature above the melting point of the metal sufficient to form a network of nanostructured carbon within a matrix of the metal; and (b) recovering the resulting covetic metal-carbon composite material from the reactor.

Embodiment 2 is the process of embodiment 1, wherein the metal comprises at least one metal selected from the group consisting of copper, aluminum, silver, gold, platinum, iron, lead, zinc, silicon, tin, and nickel.

Embodiment 3 is the process of embodiment 1 or 2, wherein the metal comprises copper; and the reactor is heated at a temperature of at least about 1150° C.

Embodiment 4 is the process of any one of embodiments 1 to 2, wherein the metal comprises aluminum; and the reactor is heated at a temperature of at least about 700° C.

Embodiment 5 is the process of embodiment 4, wherein the carbon is a particulate carbon material.

Embodiment 6 is the process of any one of embodiments 1 to 5, wherein the carbon comprises graphite.

Embodiment 7 is the process of embodiment 6, wherein the reactor is composed of graphite or a ceramic material.

Embodiment 8 is the process of any one of embodiments 1 to 7, wherein the partial pressure of oxygen is in a range of about 0.001 Torr to about 0.1 Torr.

Embodiment 9 is the process of any one of embodiments 1 to 8, wherein the carbon is introduced into the reactor through a feed tube that passes through a shield that extends over at least 50% of the area of the exposed surface of the molten metal.

Embodiment 10 is the process of embodiment 1, wherein the mixing is non-vortexing mixing.

Embodiment 11 is the process of any one of embodiments 1 to 10, wherein the total amount of carbon introduced into the metal comprises about 0.1 to about 10 percent by weight based on the total weight of the metal and carbon in the reactor.

Embodiment 12 is a process for preparing a covetic metal-carbon composite material comprising the steps of:

(a) introducing carbon into a molten metal in a heated graphite reactor while passing an electric current through the molten metal at a current density of about 10 to about 100 amperes per square centimeter by a pair of graphite electrodes contacting the molten metal and in circuit with an electrical power source; wherein the molten metal fills the reactor to a level such that an exposed surface of the metal is located about one third to one half of the distance from an internal height in the reactor; the carbon is introduced at or below the exposed surface of the molten metal utilizing non-vortexing mixing to distribute carbon within the molten metal; and the reactor is heated at a temperature above the melting point of the metal sufficient to form a network of nanostructured carbon within a matrix of the metal; and (b) recovering the resulting covetic metal-carbon composite material from the reactor;

wherein the reactor is open to ambient air, and graphite from the electrodes, the reactor, the carbon, or any combination thereof, reacts to form a reducing atmosphere comprising carbon monoxide over the exposed surface of the molten metal, and the metal comprises at least one metal selected from the group consisting of aluminum, gold, silver, lead, zinc, silicon, tin, and nickel.

Embodiment 13 is the process of embodiment 12, wherein the metal is aluminum, and the reactor is heated at a temperature of at least about 700° C.

Embodiment 14 is the process of any one of embodiments 12 and 13, wherein the carbon is graphite powder.

Embodiment 15 is a process for preparing a covetic metal-carbon composite material comprising the steps of:

(a) heating a mixture of carbon and a metal in a reactor under an atmosphere comprising a partial pressure of oxygen of not more than about 0.1 Torr, and at a temperature above the melting point of the metal sufficient to melt the mixture and form a network of nanostructured carbon within a matrix of the metal;

(b) passing an electric current through the melted metal at a current density of about 10 to about 100 amperes per square centimeter through a pair of electrodes contacting the mixture and in circuit with an electrical power source; and (c) recovering the resulting covetic metal-carbon composite material from the reactor;

wherein the metal comprises at least one metal selected from the group consisting of copper, aluminum, silver, gold, platinum, iron, lead, zinc, silicon, tin, and nickel; and the amount of carbon in the mixture comprises about 0.1 to about 10 percent by weight of the total weight of the metal and carbon in the mixture.

Embodiment 16 is the process of embodiment 15, wherein the carbon comprises graphite; and (a) the metal comprises copper; and the reactor is heated at a temperature of at least about 1150° C.; or (b) the metal comprises aluminum; and the reactor is heated at a temperature of at least about 700° C.

Embodiment 17 is the process of embodiment 15, wherein the mixture is heated under an atmosphere of ultrapure helium.

Embodiment 18 is a covetic metal-carbon composite material produced by the process of any one of embodiments 1 to 16.

DETAILED DESCRIPTION

The enhanced properties of covetic metals likely result from carbon nanostructures and networks that form between the metal matrix and carbon nanoparticles. Two distinct carbon nanostructures have been found in covetic materials: (1) carbon clusters with size ranging from a few nanometers (nm) to several hundred nm, and (2) graphene-like carbon nanostructures that become incorporated within the metal matrix. Under conditions that allow formation of metal oxide (e.g., copper oxide), such as the conditions encountered during many known processes, it is likely that the carbon is also oxidized, which causes loss of carbon and disruption of beneficial carbon nanostructures within the material.

A method for making covetic metal-nanostructured carbon composites or compositions is described herein. This method is advantageous, in that it provides substantially oxygen-free covetic materials and allows precise control of the composition of the covetic material to be produced. The method comprises introducing carbon into a molten metal in a heated reactor under low oxygen partial pressure, while passing an electric current through the molten metal. Preferably, the molten metal fills the reactor to a level such that an exposed surface of the metal is located about one third to one half of the distance from an internal height in the reactor, particularly in cases where it may be difficult to control the oxygen partial pressure, such as in an open reactor under a blanket of flowing inert gas. The carbon is introduced at (e.g., slightly above) or below the exposed surface of the molten metal utilizing non-vortexing stirring to distribute carbon within the molten metal. In a sealed reactor system with full control over the atmosphere in the reactor, the non-vortexing mixing and reactor filling limitations may be relaxed. The reactor is heated at a temperature sufficient to form a network of nanostructured carbon within a matrix of the metal (also known as "conversion"). After conversion is complete, the covetic material is recovered from the reactor, e.g., before or after cooling to a solid.

When covetic metal materials are made by the process described herein, loss of carbon is minimized or voided and carbon nanostructures are preserved, which can lead to an enhancement in physical and electrical properties of the covetic material.

Exemplary systems for carrying out the processes described herein are schematically illustrated in the accompanying drawing figures.

Figure 1:
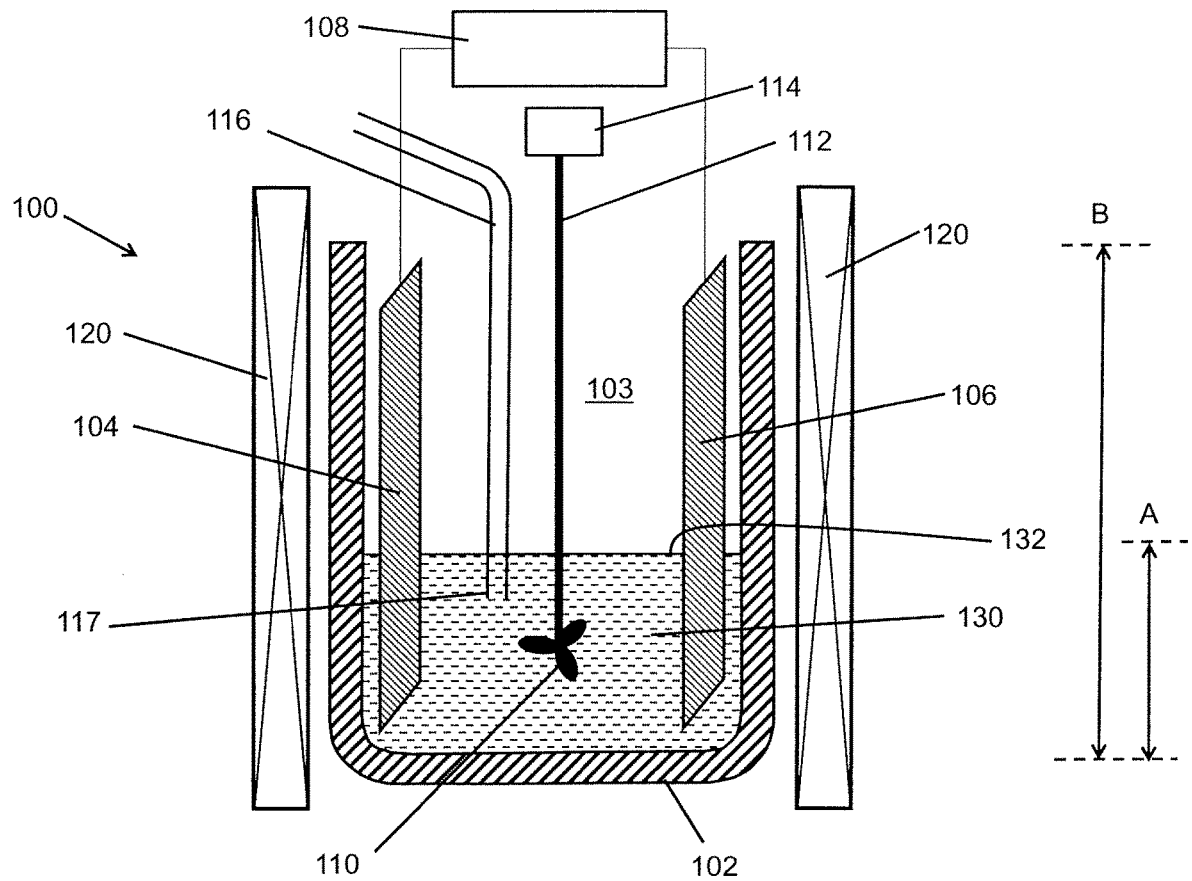
FIG. 1 schematically illustrates a reactor system for performing the processes described herein.

FIG. 1 shows a schematic representation of a reactor system for performing the processes described herein, charged with a molten metal. Reactor system 100 comprises a reactor vessel 102 including planar graphite electrodes 104 and 106 within interior space 103 of vessel 102. Electrodes 104,106 are connected to electric power supply 108. A stirring system comprising propeller 110 and stirring motor 114 connected by rotatable stirring shaft 112 is provided, in which propeller 110 and a portion of shaft 112 are within interior 103 of reactor vessel 102. A feed tube 116 extends into interior 103 of vessel 102. Reactor vessel 102 is surrounded by heater 120.

In use, metal pieces (e.g., as powder, shot, chunks, slugs, etc.) are charged into vessel 102 and heated by heater 120 to a desired temperature above the melting point of the metal to form molten metal 130. In cases where there is limited ability to control the amount of oxygen in the reactor (e.g., with a flowing inert gas in an open reactor), the amount of molten metal 130 in reactor vessel 102 is selected such that the exposed surface 132 of molten metal 130 is at a height, A, within reactor vessel 102 that is about one third to about one half of interior height, B, of reactor vessel 102. Propeller 110 is submerged below surface 132 to a level sufficient to remain below surface 132 when shaft 112 and propeller 110 are turned by motor 114 at a desired stirring speed. Once stirring has commenced, and end 117 of tube 116 is held slightly above or is submerged below surface 132. Graphite is conveyed through tube 116 into molten metal 130, at or below surface 132, at the desired temperature and is mixed with the metal by stirrer propeller 110 so that the graphite is distributed within molten metal 130, and reacts with the metal to form a covetic material. In cases where there is limited ability to control the amount of oxygen in the reactor (e.g., with a flowing inert gas in an open reactor), the graphite is gently mixed with the molten metal 130 by the stirring system at a stirring rate that does not generate a vortex in the molten metal. Avoiding a vortex helps minimize exposure of the metal to residual oxygen. The stirring is used to expose all of the carbon feedstock to the electric field for a sufficient length of time to convert all of the feedstock into a nanocarbon phase, and to maximize the uniformity of the nanocarbon phase within the melt.

Figure 2:
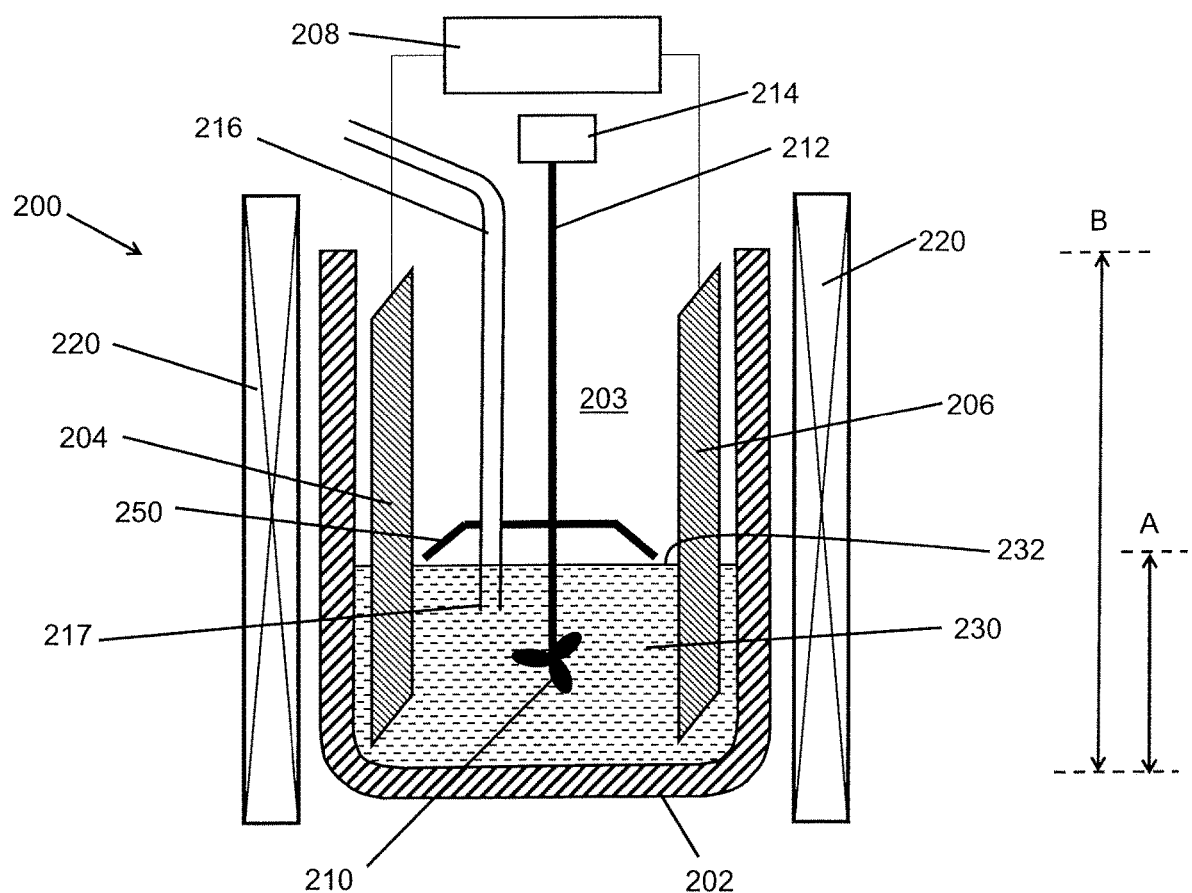
FIG. 2 schematically illustrates an alternate reactor system for performing the processes described herein.

FIG. 2 shows a schematic representation of an alternate reactor system for performing the processes described herein. Reactor system 200 is similar to system 100 of FIG. 1, and comprises a reactor vessel 202 including planar graphite electrodes 204 and 206 within interior space 203 of vessel 202. Electrodes 204,206 are connected to electric power supply 208. A stirring system comprising propeller 210 and stirring motor 214 connected by rotatable stirring shaft 212 is provided, in which propeller 210 and a portion of shaft 212 are within interior 203 of reactor vessel 202. A feed tube 216 extends into interior 203 of vessel 202. Reactor vessel 202 is surrounded by heater 220. Shield 250 is provided within interior 203 with shaft 212 and tube 216 passing through a portion of shield 250. Shield 250 helps keep carbon from volatilizing and/or oxidizing during the process and the high temperatures of the reaction, thus avoiding carbon loss. Preferably the shield extends over at least 50% of the area of the exposed surface of the molten metal 230.

Reactor system 200 is operated in substantially the same way as reactor system 100 of FIG. 1. In use, the amount of molten metal 230 in reactor vessel 202 is selected such that the exposed surface 232 of molten metal 230 is at a height, A, within reactor vessel 202 that is about one third to about one half of interior height, B, of reactor vessel 202. Propeller 210 is submerged below surface 232 to a level sufficient to remain below surface 232 when shaft 212 and propeller 210 are turned by motor 214 at a desired stirring speed. Once stirring has commenced, and end 217 of tube 216 is submerged below surface 232, graphite is conveyed through tube 216 into molten metal 230, at or below surface 232, at the desired temperature. The graphite is mixed with the molten metal 230 by the stirring system so that the graphite is distributed within molten metal 230, and reacts with the metal to form a covetic material.

Figure 3:
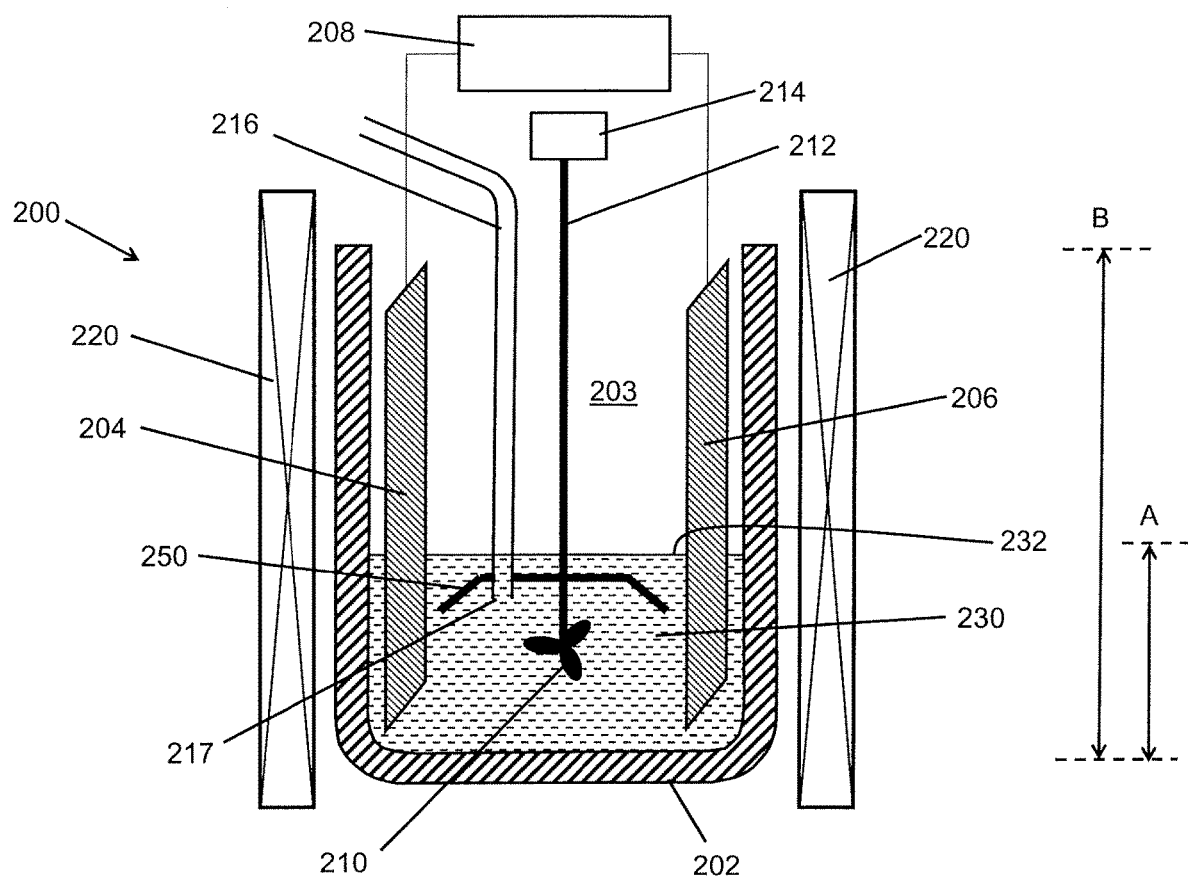
FIG. 3 schematically illustrates the reactor system of FIG. 2 in an alternate configuration.

Shield 250 is illustrated, in FIG. 2, above surface 232 of molten metal 230. FIG. 3 illustrates reactor system 200 in an alternate configuration, in which shield 250 is submerged below surface 232 of molten metal 230.

The following, non-limiting, examples are provided to further illustrate certain aspects and features of the processes described herein.

EXAMPLES

Ex. 1. Preparation of a Copper-Carbon Covetic Material

A 0.4 wt % graphite/99.6 wt % copper powder mixture was made by vibratory milling in isopropanol overnight the appropriate amounts of 99.9% pure copper powder and 99.9995% pure graphite powder. A typical batch of powder contained 597.56 g copper and 2.38 g graphite. After milling overnight, the powder mixture was dried on a hot plate on a low heat setting to remove the isopropanol. Approximately 200 g of the copper/graphite powder mixture was put into an aluminum oxide tray between two graphite electrodes. The assembly (electrodes, aluminum oxide tray, and copper/graphite powder mixture were placed into a muffle tube furnace, and the tube was closed with end caps. The furnace muffle tube was evacuated and backfilled with ultra-high purity (UHP) helium gas three times before the furnace was heated for the covetic process. The furnace was heated at a rate of about 120° C./h to about 990° C. at which time a current density of about 10 A/cm$^2$ (corresponding to current of about 30 A) was passed through the electrodes and through the copper/graphite powder mixture inside the aluminum oxide tray. After the initiating the electrical current, the furnace was heated further to 1150° C. and held for about 1 hour (h). Subsequently, the furnace was cooled at a rate of 120° C./h to room temperature. The entire process was done with UHP He flowing through the furnace. Control copper metal (no carbon) was prepared by the same process, but without any carbon present. Results: The room temperature thermal conductivity of Control-Cu was 302 Watts per meter-Kelvin (W/m·K); whereas the room temperature thermal conductivity of Cu-0.4 wt % C covetic was 313 W/m·K. The room temperature electrical conductivity of Control Cu (processed under the same conditions but without added graphite) was 50.49 megaSiemens per meter (MS/m); whereas the room temperature electrical conductivity of Cu-0.4 wt % C covetic was 52.22 MS/m. Bright field and dark field electron microscopic images of the copper covetic showed carbon nanoparticles of 10 to 50 nanometer size.

Figure 4:
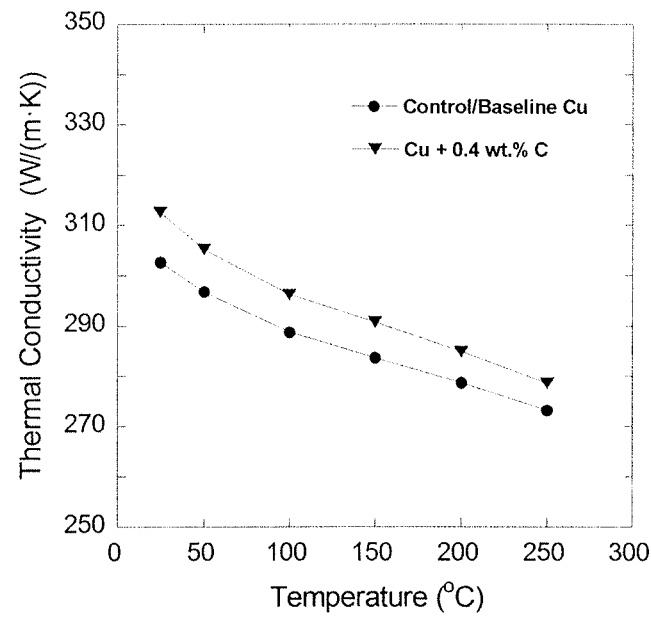
FIG. 4 shows thermal conductivity versus temperature plots for a Cu—C covetic compared to control Cu.

Plots of thermal conductivity (W/m·K) versus temperature for copper control and the covetic product are shown in FIG. 4. The results in FIG. 4 show that the thermal conductivity was consistently higher for the covetic at all temperatures compared to the copper processed under the same conditions without graphite added.

Ex. 2. General Procedure for Preparing a Metal-Carbon Covetic Material

To prepare a 0.4 wt % graphite/99.6 wt % metal (e.g., copper) covetic material, dry metal pieces are charged into a crucible (e.g., an aluminum oxide or graphite crucible) containing two planar graphite electrodes and a graphite propeller stirrer on a stirring shaft. The crucible is sized so that the metal, when melted, fills the crucible to a level of about one third to about one half of internal height of the crucible. The propeller and at least a portion of the graphite electrodes are submerged within the molten metal, and the crucible is then heated at a temperature sufficiently above the melting point of the metal to keep the metal molten during conversion and form a metal-carbon covetic material (e.g., about 1150° C. for copper metal or about 710° C. for aluminum), under an atmosphere of ultra high purity (UHP) helium gas having a partial pressure of oxygen of not more than 0.1 Torr.

The crucible is also equipped with a feed tube to introduce carbon into the metal. The feed tube (e.g., a graphite or aluminum oxide tube) is connected to a hopper for powdered graphite, and the entire tube and hopper are kept under the UHP helium atmosphere. When melted, non-vortexing mixing (e.g., about 175 RPM) is commenced with the stirrer, and the bottom of the feed tube is placed near (e.g., within about one half to one inch above) the surface of the molten metal or is submerged below the molten surface of the metal. Graphite (about 0.4 g of graphite per 100 g of metal) is then conveyed through the tube and into the molten metal. After all of the graphite is added, a current density of about 10 to 100 A/cm$^2$ is passed through the electrodes and through the mixture of metal and graphite for about 1 hour (h) while maintaining the temperature at the desired level (e.g., about 1150° C. for copper or about 710° C. for aluminum).

Optionally, a shield can be included in the crucible over the metal surface, or below the metal surface, with the end of the feed tube and the stirring shaft passing through the shield, so that the carbon (graphite) is introduced into the molten copper below the surface of the melt. The shield can help to prevent carbon loss during the process. Subsequently, the electrodes, stirrer, tube, and shield (if used) are removed and the resulting covetic material is cooled at a rate of 120° C./h to room temperature and then removed from the crucible. Alternatively, the molten covetic material can be removed from the reactor while still molten, e.g., to form ingots, etc.) and then cooled. The entire process is performed under the UHP He atmosphere to avoid undesirable copper oxide formation.

Metal covetic materials with other percentages of carbon can be prepared by the same process, but with the amount of carbon adjusted to obtain the desired percentage.

Ex. 3. Preparation of an Aluminum-Carbon Covetic Material

Figure 5:
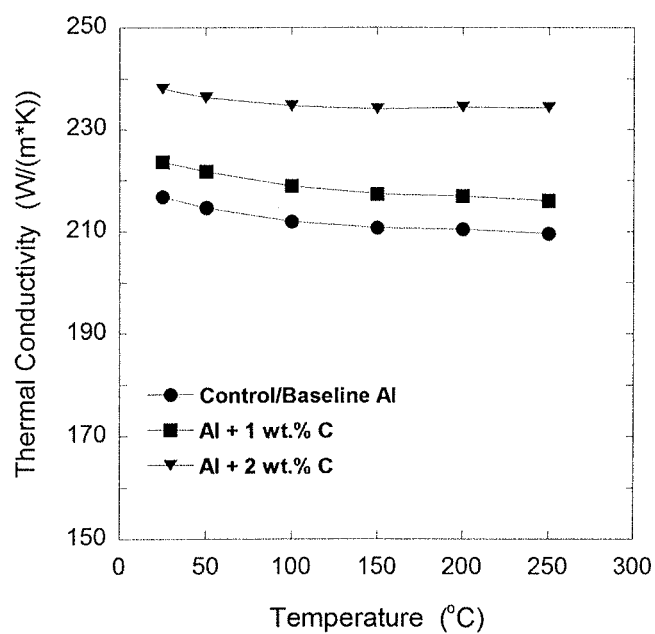
FIG. 5 shows thermal conductivity versus temperature plots for two Al—C covetics compared to control Al.

Aluminum chunks (slugs) were heated (about 710° C.) and gently stirred (175 rpm with a graphite stirrer; no vortex), keeping the molten aluminum level at about a third to a half the height from bottom of graphite crucible. Carbon was added near the surface of molten metal. Electric current (about 32 A/cm$^2$) was passed through molten aluminum/carbon mixture using pair of graphite electrodes for about 20 min. This process was carried out in air. Under these conditions it is believed that carbon monoxide forms by reaction of graphite within the reactor (e.g., from the reactor and electrodes) and blankets the surface of the molten metal, protecting the surface from excessive oxidation. For one example, 1814 grams of aluminum and 18 grams of graphite were used, to form a 1 wt % carbon Al—C covetic. In another example, 1814 grams of aluminum and 36 grams of graphite were used, to form a 2 wt % carbon Al—C covetic. As a control, aluminum was processed under the same conditions without adding any graphite. FIG. 5 shows thermal conductivity plots for the two covetic Al—C materials compared to the control Al. The room temperature thermal conductivity of control Al was about 217 W/m·K; the room temperature thermal conductivity of the Al-1 wt % C covetic was about 224 W/m·K; the room temperature thermal conductivity of the Al-2 wt % C covetic was about 238 W/m·K. The room temperature electrical conductivity of control Al was about 30.4 MS/m (52.41% of the International Annealed Copper Standard (IACS)); the room temperature electrical conductivity of the Al-1 wt % C covetic was about 30.81 MS/m (53.12% IACS); the room temperature electrical conductivity of the Al-2 wt % C covetic was about 32.85 MS/m (56.64% IACS).

Figure 6:
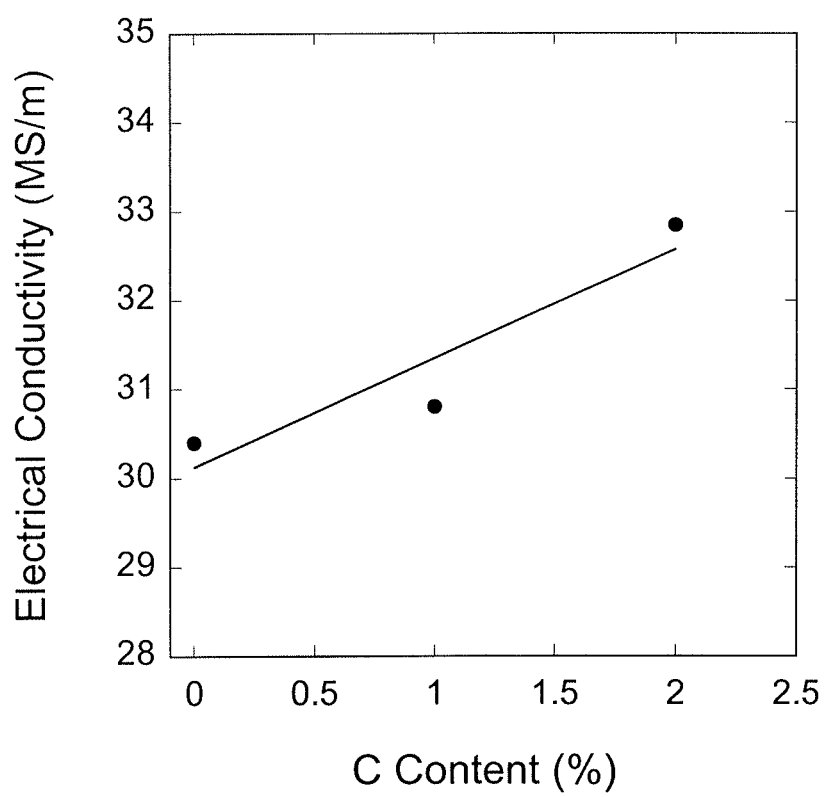
FIG. 6 shows plots of electrical conductivity versus carbon content for Al control and two Al—C covetic products.

Plots of thermal conductivity (W/m·K) versus temperature for Al control and the two Al—C covetic products are shown in FIG. 5. The results in FIG. 5 show that the thermal conductivity was consistently higher for both covetics at all temperatures compared to the aluminum processed under the same conditions without graphite added. Plots of electrical conductivity (MS/m) versus temperature for Al control and the two Al—C covetic products are shown in FIG. 6. The results in FIG. 6 show that the electrical conductivity increases with increasing carbon content.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A process for preparing a covetic metal-carbon composite material comprising the steps of:

(a) introducing carbon into a molten metal in a heated reactor under an atmosphere comprising a partial pressure of oxygen of not more than about 0.1 Torr, while passing an electric current through the molten metal at a current density of about 10 to about 100 amperes per square centimeter by a pair of electrodes contacting the molten metal and in circuit with an electrical power source; wherein the molten metal fills the reactor to a level such that an exposed surface of the metal is located about one third to one half of the distance from an internal height in the reactor; the carbon is introduced at or below the exposed surface of the molten metal with mixing to distribute carbon within the molten metal; and the reactor is heated at a temperature above the melting point of the metal sufficient to form a network of nanostructured carbon within a matrix of the metal; and (b) recovering the resulting covetic metal-carbon composite material from the reactor.

2. The process of claim 1, wherein the metal comprises at least one metal selected from the group consisting of copper, aluminum, silver, gold, platinum, iron, lead, zinc, silicon, tin, and nickel.

3. The process of claim 1, wherein the metal comprises copper; and the reactor is heated at a temperature of at least about 1150° C.

4. The process of claim 1, wherein the metal comprises aluminum; and the reactor is heated at a temperature of at least about 700° C.

5. The process of claim 1, wherein the carbon is a particulate carbon material.

6. The process of claim 1, wherein the carbon comprises graphite.

7. The process of claim 1, wherein the reactor is composed of graphite or a ceramic material.

8. The process of claim 1, wherein the partial pressure of oxygen is in a range of about 0.001 Torr to about 0.1 Torr.

9. The process of claim 1, wherein the carbon is introduced into the reactor through a feed tube that passes through a shield that extends over at least 50% of the area of the exposed surface of the molten metal.

10. The process of claim 1, wherein the mixing is non-vortexing mixing.

11. The process of claim 1, wherein the total amount of carbon introduced into the metal comprises about 0.1 to about 10 percent by weight based on the total weight of the metal and carbon in the reactor.

12. A covetic metal-carbon composite material produced by the process of claim 1.

* * * * *